Figure 1:
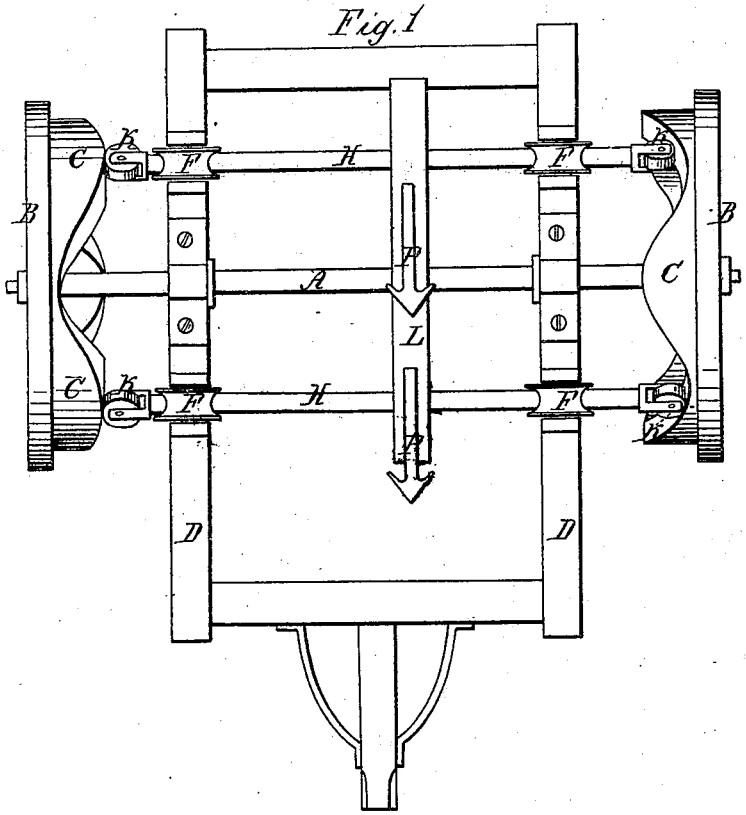
Figure 2:
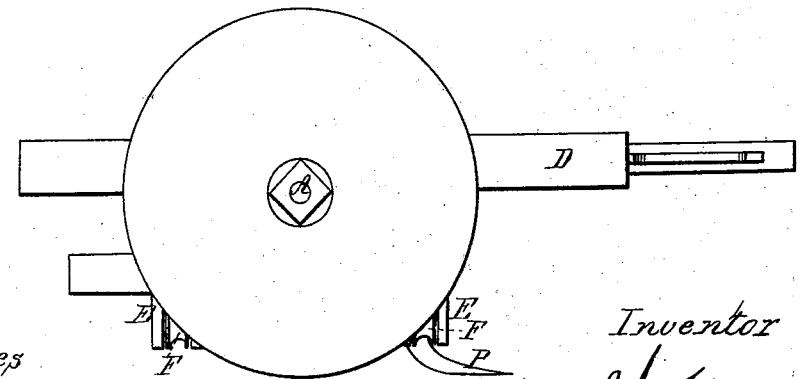

I. J. Kidd.
Rotary Cultivator.

No. 77,292.    Patented Apr. 28, 1868.

Witnesses
V. D. Stockbridge

Inventor
I. J. Kidd

United States Patent Office.

I. J. KIDD, OF YOUNG'S SETTLEMENT, TEXAS.

Letters Patent No. 77,292, dated April 28, 1868.

IMPROVEMENT IN COTTON-SCRAPERS.

*The Schedule referred to in these Letters Patent and making part of the same.*

TO ALL WHOM IT MAY CONCERN:

Be it known that I, I. J. KIDD, of Young's Settlement, in the county of Bastrop, and in the State of Texas, have invented certain new and useful Improvements in Cotton-Scrapers; and do hereby declare that the following is a full, clear, and exact description thereof, reference being had to the accompanying drawings, and the letters of reference marked thereon.

In the annexed drawings, making a part of this specification, A represents a horizontal shaft, upon the ends of which are rigidly secured wheels, B B, which serve as drive as well as carriage-wheels. On the inner face or side of both wheels is secured a series of cams, C C, arranged so that the projections on one wheel are exactly opposite the depressions on the other, thereby making the faces thereof equidistant apart at all points. These cams, C C, may be at any angle desired, and any required number may be used, according to the diameter of the wheels B B, and the distance or amount of play required of the ploughs or scrapers.

D represents a suitable frame, adjusted and secured on the axle or shaft A, as shown in the drawings. Projecting downward from the sides of the frame D are suitable posts, E E, provided with grooves, in which are adjusted, in any convenient manner, pulleys F F.

H H represent horizontal bars, which extend across between the faces of the cams C C, and are adjusted in the grooves of the posts E E, above the pulleys F F, and rest on said pulleys. The bars H H are each provided with friction-rollers, K K, in the ends thereof, which rest against and just fit between the cams C C. Said bars are secured, in a substantial manner, to a beam, L, which connects them together, and works laterally with and by them. The beam L has two ploughs or scrapers, P P, of any desired or suitable construction, adjusted in it.

By attaching a horse or other power to the frame D, in any convenient manner, the wheels B B, with their cams C C, revolve, and give a lateral and forward motion to the bars H H, beam L, and the ploughs P P; and as they work backward and forward, the ploughs each describe a zigzag line, which cross and leave a hill in diamond-shape undisturbed.

This device is admirably adapted to and is designed for cultivating or working and marking or scraping young cotton-plants, which come up in a continuous row into hills.

Having thus fully described my invention, what I claim as new, and desire to secure by Letters Patent, is—

The cams C C, in combination with the horizontal bars H H, beam L, and ploughs or scrapers P P, when constructed, arranged, and used substantially as and for the purpose specified.

In testimony that I claim the foregoing, I have hereunto set my hand and seal, this 11th day of December, 1867.

I. J. KIDD. [L. S.]

Witnesses:
   SETH W. BIGGS,
   JOHN R. COOK.